Patented Feb. 11, 1947

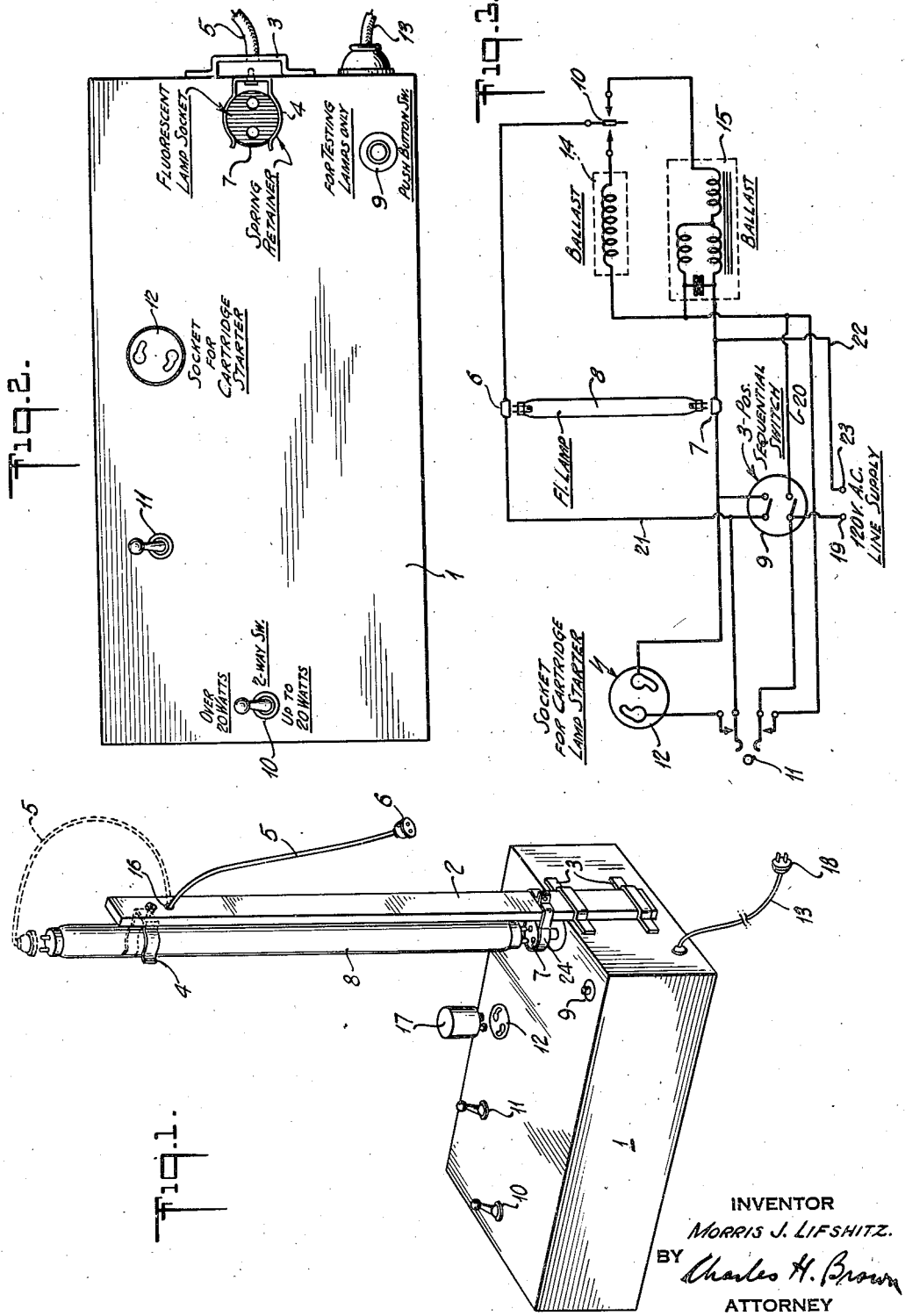

2,415,502

UNITED STATES PATENT OFFICE 2,415,502

ELECTRIC GASEOUS DISCHARGE LAMP TESTING UNIT

Morris J. Lifshitz, Brooklyn, N. Y.

Application March 29, 1945, Serial No. 585,404

14 Claims. (Cl. 315—364)

This invention relates generally to a method of and apparatus for testing electric gaseous discharge lamps, particularly those known in the art as fluorescent lamps, which have thermionic cathodes.

The fluorescent lamps now sold over retail counters have a variety of electrical sizes and also a variety of physical dimensions. These lamps vary in dimension from about one foot to four feet. When it is desired to test these lamps during a sale, it is customary to place the lamp in a horizontal position, either on a wall or board, or under a table, and by careful manipulation place the lamp between two fixed sockets. Lamps of different dimensions require differently spaced sockets. In testing the lamp in this manner, it is important to hold the lamp with two hands while it is being inserted into the socket at both terminals, otherwise the lamp might fall and break. Furthermore, the testing of the starter switch requires additional manipulation. This conventional method of testing requires not only some knowledge of electrical circuits on the part of the tester but also considerable space in the store which can be used to advantage for other purposes. Because the terminal sockets for testing the lamps must be permanently positioned, there exists the additional disadvantage of a permanent and non-portable arrangement which interferes with the free movement of the sales personnel.

The foregoing disadvantages are overcome in the present invention which has for its objects the simplification of the circuits and controls in the testing of fluorescent lamps and starters; the provision of a small, portable compact testing unit of few parts which occupies very little space and is especially suitable for use on counters in retail stores; the provision of a simplified testing unit for fluorescent lamps which requires no electrical knowledge on the part of the tester and which can be efficiently used by a sales person with a minimum of instruction; the provision of a fluorescent lamp testing unit which can be operated with a single hand in handling the lamp and in manipulating the tester; the provision of a compact, portable testing unit for fluorescent lamps of different sizes which can be shipped in a small container in a knocked-down condition and which requires only a simple operation to condition it for use; and the provision of a fluorescent lamp testing unit which can test lamps of different dimensions and sizes in a vertical position.

The following is a detailed description of the invention in conjunction with a drawing, wherein:

Fig. 1 illustrates a perspective view of the portable tester unit of the invention with the parts housed in a casing, as the tester is generally used;

Fig. 2 is a plan view of the tester unit of Fig. 1; and

Fig. 3 is a schematic circuit diagram of the testing unit of the invention.

Throughout the different figures of the drawing, the same parts are represented by the same reference numerals.

Referring to Fig. 1, there is shown a small, compact, portable apparatus 1 for testing both the electric gaseous lamp, shown by way of example as 8, and also a cartridge starter 17. Lamp 8 may be a conventional discharge tube comprising a glass envelope containing an inert gas and mercury vapor and having a coating of fluorescent material on the interior surface of its envelope. This tube contains thermionic cathodes at both ends which are connected to suitable terminal prongs or lead-in wires, as shown. The testing apparatus includes a suitable housing which may be made of metal, wood or a plastic material for accommodating in its interior the electrical circuits. Connection from the testing apparatus to the 110–120 volt alternating current power supply is made by means of a cord 13 and connection plug 18 adapted to be inserted in the usual wall socket. Attached to the housing at one end is a hollow vertical rod 2 which is held in place by a pair of clamps 3. Rod 2 may be made in the form of a metal molding somewhat analogous to a hollow curtain rod. This rod 2 is removable and accommodates in its interior an insulated two-conductor cord 5 which extends from the rod through an aperture 16. The removable nature of rod 2 permits the testing apparatus to occupy very little space when shipped in a knocked-down condition. The upper end of rod 2 is provided with a spring-like lamp holder or clamp 4 for holding the lamp 8 upright in a vertical position during testing and also while manipulating the lamp into position to be tested. Obviously, other types of lamp holders can be used instead of the particular type shown by 4; for example, this clamp can merely be a hollow circular arrangement attached to the upper portion of rod 2 for holding the lamp 8 in position and permitting easy movement therethrough.

Cord 5 is flexible and is provided at its exterior end with a socket 6 suitable for use with the lamp terminal prongs or lead-ins at one end (upper end) of the lamp 8. The dotted lines indicate the position of cord 5 when in use for testing the lamp. The terminal prongs at the other end (lower end) of lamp 8 fit into socket 7 mounted in the testing apparatus. Socket 7 is so mounted on the housing that it normally rests in an apertured hemispherical bowl 24 which is clamped to the rod 2, but can be lifted out of the bowl for use in testing circular or horse-shoe types of fluorescent lamps. Obviously, if desired, the socket can be permanently mounted so as to be flush with the face of the housing. The testing unit is also provided with a three-position sequential switch 9 of the push button type, a two-way switch 10, a double-pole single-throw switch 11, and a socket 12 which is used for testing a cartridge starter 17.

The push button switch 9 may be called a starter switch and is well known in the art. It has two pairs of contacts as shown in Fig. 3. When first operated by pressing down on the switch, both pairs of contacts are closed. When the push button is released, one pair of contacts opens (the starter contacts) while the other pair of contacts remains closed. Any further operation of the push button switch 9 opens the remaining pair of contacts, thus restoring the switch 9 to the original condition. Although the switch 9 can be replaced by two separate pushbutton switches each having a single pair of contacts, it is preferred to use the three-position sequential switch 9 in the interest of simplicity of operation.

Switch 10 is a two-way switch which in different positions will effectively connect different ballasts (reactors) 14 and 15 (note Fig. 3) into the circuit for testing different sizes (electrical values) of lamps. Thus, in one position in which ballast 14 is operatively connected into the circuit, the testing apparatus is designed to test 14 watt, 15 watt and 20 watt lamps. In the other operative position of the switch 10, the ballast 15 (auto-transformer) is operatively connected into the circuit, and the testing apparatus will test 30 watt and 40 watt lamps. Obviously, switch 10 can be replaced by a circular type switch having a sliding contact arm adjustable by hand to alternately engage three or four or more contacts for testing other sizes (electrical values) of lamps by effectively connecting into the circuit in different positions of the arm other reactors suitably designed to energize and light up the different lamps.

The operation of the testing apparatus will now be given with particular reference to Fig. 1 and the schematic circuit diagram of Fig. 3. Plug 18 is inserted into the alternating current power supply socket. The lamp to be tested is inserted into clamp 4 so that it is held in a vertical position at a point intermediate its ends. The lower end of the lamp is then inserted into socket 7. The cord 5 is then raised to assume the position shown by the dash lines of Fig. 1, and the socket 6 placed on the upper end of the lamp for operative association with the thermionic cathode prongs at that upper end. If the lamp is of the 14 watt, 15 watt or 20 watt size, the two-way switch 10 is thrown to the left to operatively connect ballast (reactor) 14 into the circuit. However, if the lamp is of the 30 watt or 40 watt size, the switch 10 is thrown to the right to operatively connect the ballast 15 into the circuit. Let it be assumed that switch 10 is thrown to the left to cause the ballast 14 to be connected into the circuit. At this time, it should be noted that switch 11 is open. Push button switch 9 which is now assumed to be in its initial or normal position in which both pairs of contacts are open, is depressed and this operation causes both pairs of contacts to close. This may be called the second position of the switch 9. An obvious circuit will then be closed from the power supply terminal 19, through the lower pair of contacts of switch 9, lead 20, winding of ballast 14, closed left hand contact and armature of switch 10, socket 6, lead 21, through the upper pair of contacts of switch 9, socket 7, and lead 22 back to the other terminal 23 of the alternating current supply. The thermionic cathodes at both ends of lamp 8 will then heat up, and upon reaching a proper temperature will start the lamp. When the lamp lights up or starts, the push button 9 is released by removing the finger of the operator and this action will cause the upper pair of contacts in this switch to break while still maintaining the lower pair of contacts closed. This may be called the third position of the switch 9. The lamp will remain lit, however, at this time because of the discharge through the lamp and the completion of the circuit from sockets 6 and 7 to opposite terminals 19 and 23 of the power supply. In order to break the circuit through the lamp, it is only necessary to again depress the push button 9 which now opens all contacts therein and restores or resets this switch to its initial or normal (first) position.

It will thus be seen that only a single push button is required to test the lamp.

Similar circuit paths are used when switch 10 is thrown to the right, except that now the ballast 15 is operatively connected into the circuit instead of ballast 14.

If it is desired to test a cartridge starter switch, such as 17 of Fig. 1, this cartridge starter is inserted into socket 12. Switch 11 is then thrown, and a complete circuit will be closed to start the lamp over a path from terminal 19, through the lower pair of contacts of switch 11, through the selected ballast and switch 10, through socket 6, lead 21, upper pair of contacts of switch 11, the cartridge starter 17, socket 7, lead 22 to terminal 23. For this test, the switch 9 is not used. If the cartridge starter is satisfactory, the lamp 8 will light up, assuming, of course, that the lamp is good. It should be noted that if during this last test the push-button switch 9 should be accidentally operated, nothing will happen to harm the lamp. The accidental operation of switch 9 will merely shunt out the socket 12 and switch 11.

In one embodiment of the invention which was constructed and satisfactorily operated, the housing 1 was eight inches long, four inches wide and three inches high. Obviously, smaller or larger dimensioned housings may be used. The ballast 14 was a General Electric type 58G671, the ballast 15 was a General Electric type 58G677, and the push button switch 9 was a product of the Leviton Manufacturing Company, Brooklyn, New York, Cat. No. 382. This apparatus was light in weight, portable, and occupied an extremely small space. The vertical rod feature has enabled this testing apparatus to be used anywhere on the counter, while the simplicity of the circuit has permitted its use by unskilled labor having no electrical knowledge.

An important advantage of the invention is the fact that the same two sockets 6 and 7 are used for all sizes of lamps.

Obviously, the testing apparatus of the invention is not limited for use solely with 110-120 volts alternating current power supply but can be used with higher values of power supply, provided the circuit elements are made to have suitable constants and/or suitable voltage transforming circuits are employed between the alternating current power supply and the testing apparatus.

What is claimed is:

1. Electrical testing apparatus for electric gaseous discharge lamps comprising a housing, and a lamp support adapted to be mounted vertically on said housing and having lamp holding means secured thereto, said apparatus having means associated therewith for testing the lamps in a vertical position.

2. Electrical testing apparatus for electric gaseous discharge lamps comprising a housing, a hollow lamp support adapted to be mounted vertically on said housing, lamp holding means secured to said support, a flexible electrical cord in circuit with said apparatus and positioned in the hollow portion of said support and extending out from an aperture in said support, said cord having a socket at one end for operative association with one end of the lamp to be tested, said housing having a socket for operative association with the other end of the lamp to be tested.

3. A fluorescent lamp tester comprising a housing, a rod-like lamp support for the lamp to be tested, a clamp on said housing enabling the insertion of said support in a vertical position and the easy removal of said support from said clamp, said support having lamp holding means secured thereto, said tester having means for testing lamps in a vertical position.

4. A fluorescent lamp tester comprising a housing, a hollow rod-like lamp support for the lamp to be tested, a clamp on said housing enabling the insertion of said support in a vertical position and the easy removal of said support from said clamp, said support having lamp holding means secured thereto, a flexible electrical cord in circuit with said tester and positioned in the hollow portion of said support and extending out from an aperture in said support, said cord having a socket at one end for operative association with one end of the lamp to be tested, said housing supporting another socket for operative association with the other end of the lamp to be tested.

5. Electrical testing apparatus for electric gaseous discharge lamps comprising a box-like housing, said housing accommodating a plurality of ballast elements for testing different sizes of lamps, a multi-position switch having different contacts connected to different ballast elements, a three-position sequential lamp starting switch, a socket substantially flush with the upper surface of said housing for operative association with one end of the lamp to be tested, a flexible electrical cord having a socket for operative association with the other end of the lamp to be tested, and a lamp support adapted to be mounted vertically on said housing and having lamp holding means secured thereto for supporting a lamp in a vertical position.

6. A fluorescent lamp tester comprising a box-like housing accommodating a plurality of ballast elements for testing different sizes of lamps, a multi-position switch having different contacts connected to different ballast elements, a three-position sequential starting switch, a socket supported by said housing for operative association with one end of the lamp to be tested, a lamp support adapted to be mounted vertically on said housing and having lamp holding means secured thereto for supporting a lamp in a vertical position, and a flexible electrical cord in circuit with said tester and having a socket at one end for operative association with the other end of the lamp to be tested.

7. A fluorescent lamp tester comprising a housing, a rod-like lamp support for the lamp to be tested, a clamp on said housing enabling the insertion of said support in a vertical position and the easy removal of said support from said clamp, said support having lamp holding means secured thereto, and a flexible electrical cord in circuit with said tester and having a socket at one end for operative association with one end of the lamp to be tested.

8. Electrical testing apparatus for an electric gaseous discharge lamp of the type having an elongated gas-containing envelope provided with thermionic cathodes at both ends, comprising portable and compact equipment having a housing therefor, said apparatus including a pair of sockets for operative association with the cathodes at both ends of the lamp to be tested, at least one of said sockets being attached to a movable and flexible electrical cord, and a lamp holding element for supporting the lamp to be tested at a location intermediate the ends of the lamp.

9. Electrical testing apparatus for an electric gaseous discharge lamp of the type having an elongated gas-containing envelope provided with thermionic cathodes at both ends, comprising portable and compact equipment having a housing therefor, said apparatus including a pair of sockets for operative association with the cathodes at both ends of the lamp to be tested, at least one of said sockets being attached to a movable and flexible electrical cord, and a clamp attached to said housing for supporting the lamp to be tested.

10. Electrical testing apparatus for an electric gaseous discharge lamp of the type having an elongated gas-containing envelope provided with thermionic cathodes at both ends, comprising portable and compact equipment having a housing therefor, said apparatus including a pair of sockets for operative association with the cathodes at both ends of the lamp to be tested, at least one of said sockets being attached to the end of a movable and flexible electrical cord, another socket permanently mounted in said housing for use in testing a cartridge type starter, individual and independently hand operated switches on the face of said housing for use in testing a lamp or a cartridge type starter, and a lamp holding element adapted to be secured to said housing for supporting the lamp to be tested at a location intermediate the ends of the lamp.

11. Electrical testing apparatus for an electric gaseous discharge lamp of the type having an elongated gas-containing envelope provided with thermionic cathodes at both ends, comprising portable and compact equipment having a housing therefor, said apparatus including a pair of sockets for operative association with the cathodes at both ends of the lamp to be tested, one of said sockets being attached to a movable and flexible electrical cord, and the other socket being substantially flush with the upper face of said housing, said housing accommodating a plurality of ballasts for testing different sizes of lamps, a multi-position hand operated switch having different contacts connected to different ballasts for alternate operative association in the circuit of said apparatus, and a lamp holding element adapted to be secured to said housing for supporting the lamp to be tested at a location intermediate the ends of the lamp.

12. Electrical testing apparatus for an electric gaseous discharge lamp of the type having an elongated gas-containing envelope provided with thermionic cathodes at both ends, comprising means for supporting the envelope of the lamp to be tested at a point intermediate the ends of said envelope during the testing procedure, and means for supplying electrical current to the lamp to be tested.

13. Electrical testing apparatus for electric gaseous discharge lamps comprising a housing, and a lamp support adapted to be mounted vertically on said housing and having lamp holding means secured thereto, said lamp support comprising a rigid element adapted to be secured to said housing and having an effective vertical length which is smaller than the length of the lamp to be tested, the free end of said lamp support having a substantially circular portion for holding the envelope of the lamp to be tested, said apparatus having means associated therewith for testing the lamps in a vertical position.

14. A fluorescent lamp tester comprising a box-like housing, a lamp support adapted to be mounted vertically on said housing, the effective vertical length of said lamp support being smaller than the length of the lamp to be tested, a socket in said housing for operative association with one end of the lamp to be tested, a flexible electrical cord in circuit with said tester and having a socket for operative association with the other end of the lamp to be tested, the free end of said lamp support having lamp holding means arranged above and in a straight line with said socket in said housing.

MORRIS J. LIFSHITZ.

REFERENCES CITED

The following references are of record in the file of this patent:

UNITED STATES PATENTS

| Number | Name | Date |
| --- | --- | --- |
| 2,200,443 | Dench | May 14, 1940 |
| 2,236,039 | Sola | Mar. 25, 1941 |
| 2,291,355 | Simmon | July 28, 1942 |
| 2,305,474 | Hays | Dec. 15, 1942 |
| 2,361,017 | Flick | Oct. 24, 1944 |